United States Patent
Canova

(10) Patent No.: US 11,451,037 B2
(45) Date of Patent: Sep. 20, 2022

(54) SHIELDED BUSBAR

(71) Applicant: BESHIELDING S.R.L., Rivoli (IT)

(72) Inventor: Aldo Canova, Rivoli (IT)

(73) Assignee: BESHIELDING S.R.L., Rivoli (IT)

( * ) Notice: Subject to any disclaimer, the term of this patent is extended or adjusted under 35 U.S.C. 154(b) by 0 days.

(21) Appl. No.: 17/291,130

(22) PCT Filed: Apr. 17, 2020

(86) PCT No.: PCT/IB2020/053651
§ 371 (c)(1),
(2) Date: May 4, 2021

(87) PCT Pub. No.: WO2020/234660
PCT Pub. Date: Nov. 26, 2020

(65) Prior Publication Data
US 2021/0391699 A1    Dec. 16, 2021

(30) Foreign Application Priority Data

May 20, 2019    (IT) .......................... 202019000001551

(51) Int. Cl.
*H02G 5/06* (2006.01)
*H02G 5/00* (2006.01)

(52) U.S. Cl.
CPC ............... *H02G 5/06* (2013.01); *H02G 5/002* (2013.01); *H02G 5/005* (2013.01)

(58) Field of Classification Search
CPC .......... H02G 5/005; H02G 5/002; H02G 5/04; H02G 5/00; H02G 5/06
See application file for complete search history.

(56) References Cited

U.S. PATENT DOCUMENTS

| | | | |
|---|---|---|---|
| 7,786,382 B2 | 8/2010 | Burguera | |
| 2007/0144754 A1* | 6/2007 | Donazzi | H02G 9/04 |
| | | | 174/34 |
| 2009/0178824 A1* | 7/2009 | Burguera | H02G 5/06 |
| | | | 174/68.2 |

FOREIGN PATENT DOCUMENTS

| CN | 202817654 U | 3/2013 |
|---|---|---|
| EP | 1652280 B1 | 2/2019 |
| JP | H09182260 A | 7/1997 |

OTHER PUBLICATIONS

International Search Report and Written Opinion of the International Searching Authority for International Application No. PCT/IB2020/053651 dated Jun. 5, 2020.

* cited by examiner

*Primary Examiner* — Hoa C Nguyen
*Assistant Examiner* — Amol H Patel
(74) *Attorney, Agent, or Firm* — Heslin Rothenberg Farley & Mesiti P.C.; Victor A. Cardona, Esq.

(57) ABSTRACT

A busbar having a magnetic shielding structure arranged between conductor bars and an outer casing. The magnetic shielding structure includes a first shielding element and a second shielding element each having a U-shaped cross-section. The shielding elements are made of ferromagnetic material and enclose—on opposite sides—conductor bars so that each fin of the first shielding element is at least partially superimposed on a homologous fin of the second shielding element. The shielding elements can consist of anisotropic ferromagnetic strips with oriented grains.

9 Claims, 3 Drawing Sheets

SHIELDED BUSBAR

FIELD OF THE INVENTION

The present invention regards systems for the transportation and distribution of electrical energy and more particularly it regards busbars.

STATE OF THE PRIOR ART

The busbars are prefabricated electric bars consisting of modular structures comprising conductor elements, normally in the form of rigid bars made of conductive material, typically copper or aluminium, in a support casing made of conductive or ferromagnetic or combined material, which also serves the function of thermal dissipation of the heat produced due to the Joule effect by such conductor bars and sometimes even a first containment of the emitted magnetic field.

Busbars are used as an alternative to the use of electric cables, especially in the commercial and industrial field. The busbars can be used for conducting currents of a few tens up to several thousands of amperes, offering some advantages with respect to conventional cables such as, for example, modularity, ease of installation, safety and modularity of the components attached thereto such as shunts, sockets etc.

The so-called "compact busbars" systems, in which the conductor bars are insulated by means of a thin insulating layer, ensuring a high proximity between the phases, corresponding to which is a small volume of overall dimension, have been developed recently.

Another advantage of the busbars with respect to the electric cables lies in the fact that the electromagnetic compatibility, for example, a compact type of busbar traversed by a current intensity of about 2000 (A) (Amperes), is capable of guaranteeing a magnetic induction level lower than 3 ($\mu$T) (Microteslas) within 1 m from the bar, limit established for the protection of people in Italy. However, often lower magnetic induction values may be required at such a distance, for example 0.2-0.1 ($\mu$T), especially when the busbars installed in environments where electronic equipment is present. With a busbar of the compact type not provided with magnetic shielding, this value is reached at several metres from the axis of the bar. In addition, capacity values that can even reach 6000 (A), which correspond to even higher magnetic induction values, are often required.

A conventional solution for mitigating the magnetic fields generated by the busbars provides for a shielding arranged on the external and wound on the casing, with the problem of entailing an increase in temperatures, especially in the case of the busbars traversed by currents with intensity higher than 400-500 (A). This solution also requires a complex work of adapting said outer shielding to the outer casing of the busbars, sometimes carried out by specialised technicians after installation in the place of use.

Japanese patent application JP 09182260 discloses a busbar provided with a magnetic shielding which can consist of two juxtaposed and spaced U-shaped elements made of conductive material, for example copper or iron, arranged between the conductor bars and the outer casing. This solution is poorly effective at mitigating the magnetic fields outside the busbar due to the conductive material, which is poorly effective for this application, and the shape of such proposed shielding.

Chinese utility model CN 2028176540 describes a busbar provided with a monolithic tubular steel body inside the casing for reducing electromagnetic interference. This tubular body is difficult to manufacture and it complicates the assembling of the conductive bars therein.

EP1652280 A1 describes an electrical power transmission line in which the electric cables are shielded by a shielding element made of ferromagnetic material and comprising a U-shaped base and a cover having an edge partially overlapping the base.

SUMMARY OF THE INVENTION

The object of the present invention is to overcome the drawbacks mentioned above by providing a shielding for busbars having an improved magnetic shielding effectiveness, that are easy to manufacture and quick to assemble.

According to the invention, these objectives are achieved by a busbar having the characteristics described in claim 1.

The primary characteristic of the busbar according to the present invention lies in the fact that the magnetic shielding structure, arranged between the conductor bars and the outer casing, consists of a first shielding element and a second shielding element, each of which is formed by at least one U-shaped folded strip comprising two fins and a base, made of ferromagnetic material and enclosing—on opposite sides—the conductor bars so that each fin of a shielding element is at least partially superimposed on the homologous fin of the other shielding element.

The ferromagnetic material of the shielding elements allows the reduction of the magnetic induction by absorbing the magnetic field produced by the conductor bars: in particular, the pair of ferromagnetic shielding elements constitutes a magnetic circuit in which the reluctance of the air gap is minimised by increasing the facing surface, hence the superimposition of the fins of the screening elements further increases the effectiveness of the shielding structure.

In a preferred embodiment, the shielding elements consist of anisotropic ferromagnetic strips. Thanks to this characteristic, the efficiency of the magnetic shielding of a busbar according to the invention can be improved since an anisotropic ferromagnetic material has a greater shielding capacity of a magnetic field than an isotropic material due to the known phenomenon of magnetic anisotropy, i.e. the directional dependence of the magnetic properties of a material.

In order to further increase the shielding effectiveness, in an embodiment of the invention, the anisotropic ferromagnetic strips have grains oriented in a direction orthogonal to the longitudinal axis of the conductor bars.

In an embodiment of the invention, each fin of the first shielding element is totally superimposed on the homologous fin of the second shielding element.

In further embodiments of the invention at least one of the conductor bars is partially enclosed by a coating made of insulating material or the conductor bars are separated by insulating material.

According to a further aspect of the invention, the plurality of conductor bars has a generally prismatic shape with two larger sides and two smaller sides. The bases of each shielding element face the respective surfaces of the smaller sides of the plurality of conductor bars and the fins face the respective surfaces of the larger sides of the plurality of conductor bars. In a further embodiment of the invention, the bases of each shielding element face the respective surfaces of the larger sides of the plurality of conductor bars and the fins face the respective surfaces of the smaller sides of the plurality of conductor bars.

Further advantages of the shielding structure of the busbar according to the invention are:

the shielding is not visible on the outside and the duct is made "shielded", the modularity of the busbar is not lost and shielded sections can be interfaced with unshielded sections same case applying to shielded accessories with unshielded accessories.

the shielding arranged between the busbars and the casing facilitates the heat exchange in the duct between the bars and the casing, thus reducing the temperature of the bar considering the same current.

BRIEF DESCRIPTION OF THE DRAWINGS

Further characteristics of the invention will be apparent from the following detailed description, with reference to the attached drawings, provided by way of non-limiting example, wherein.

DETAILED DESCRIPTION OF THE INVENTION

Figure 1:
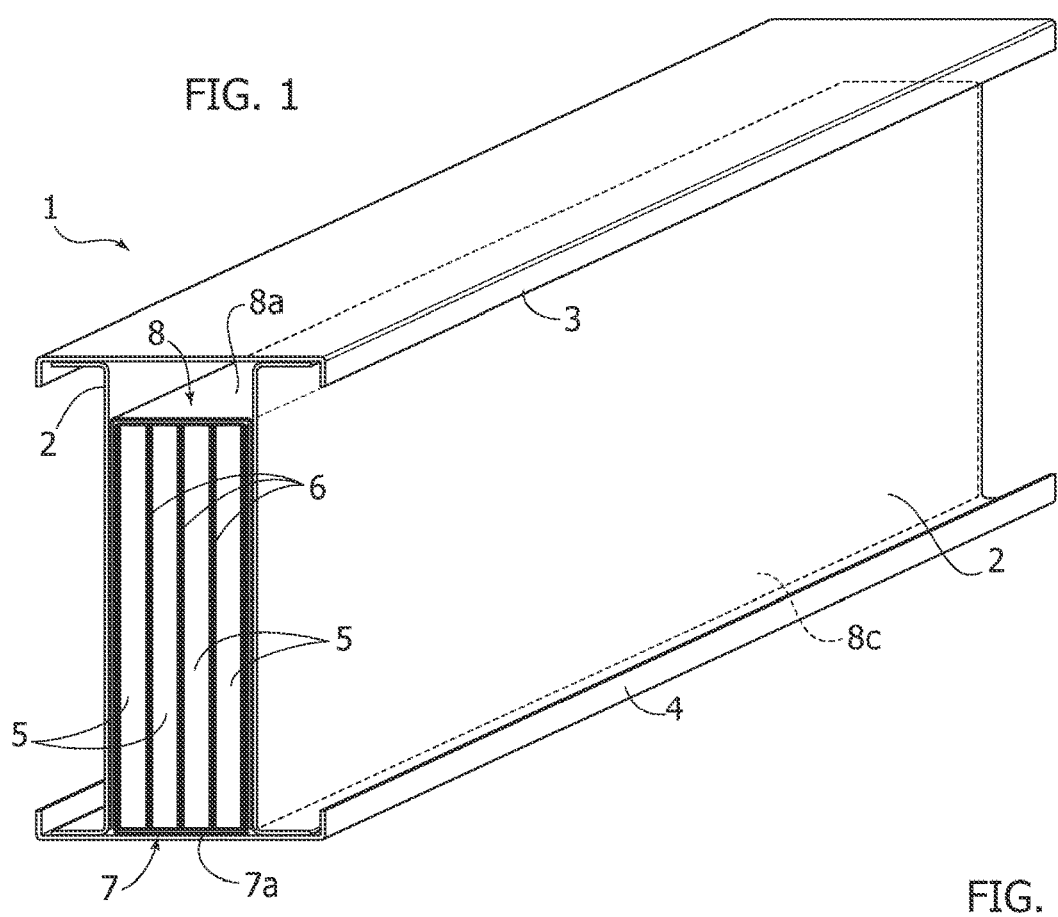
FIG. 1 is a schematic perspective and partially sectioned view of an embodiment of the busbar according to the invention.

Initially with reference to FIG. 1, a busbar comprising an outer support casing 2 in the form of an elongated parallelepiped and provided, at the smaller lateral faces thereof, with an upper flange 3 and a lower flange 4 is indicated with 1. Arranged inside the casing 2 is a plurality of conductor bars 5 with a flattened rectangular-shaped cross-section, arranged parallel to each other along the longitudinal direction of the casing 2 so that the larger lateral surfaces of the adjacent conductor bars face each other. Provided for in the example illustrated in the figures are four conductor bars 5 according to a typical arrangement of the three-phase conductors (three phase conductors and one neutral conductor). It is clear that the number of conductor bars may vary depending on the applications.

Figure 2:
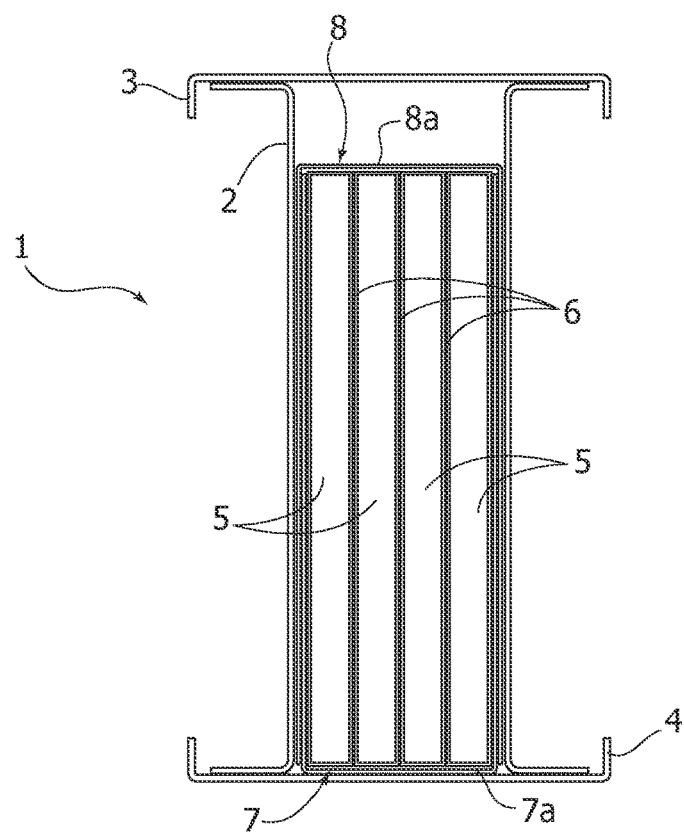
FIG. 2 is a front view of FIG. 1, and FIGS. 3, 4 and 5 are perspective views showing a final step of the assembly of different embodiments of the busbar according to the invention.

As better observable in FIG. 2, the larger and smaller lateral faces of each conductor bar 5 are at contact with a coating made of insulating material 6.

Figure 3:
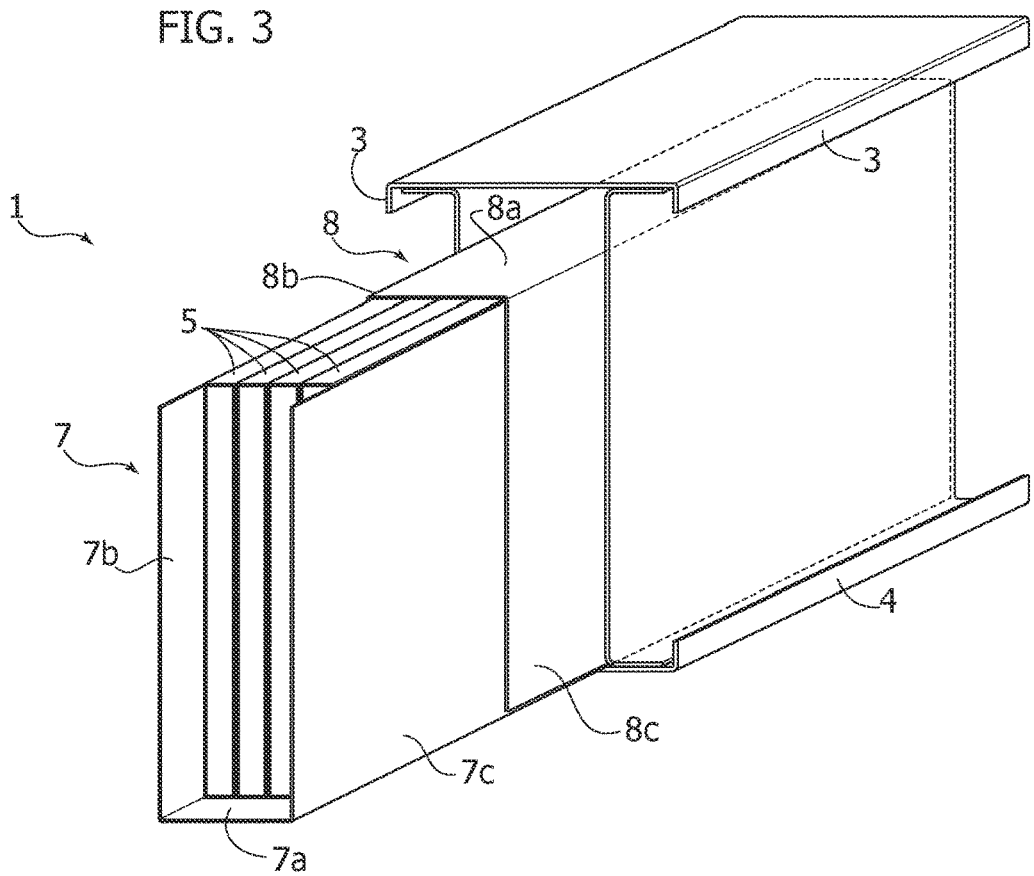

With reference to FIG. 3, the busbar 1 comprises a shielding structure including a first and a second shielding element 7, 8, each of which is formed by a strip made of U-shaped folded ferromagnetic material. The first shielding element has a base 7a and two fins 7b, 7c which extend orthogonally to the base 7a on opposite sides thereof. Likewise, the second shielding element 8 has a base 8a and two fins 8b, 8c which extend orthogonally to the base 8a on opposite sides thereof.

With reference to FIGS. 1 and 3, in the assembled busbar 1, the first shielding element 7 is arranged so that the fins 7b, 7c face the outer larger lateral surfaces of the respective conductor bars 5 and the base 7a faces the lower smaller surfaces of the group of conductor bars 5. The second shielding element 8 is arranged in a mirror-like manner with respect to the first shielding element 7, so that fin 8b is superimposed on fin 7b, fin 8c is superimposed on fin 7c and the base 8a faces the upper smaller surfaces of the group of conductor bars 5.

Figure 5:
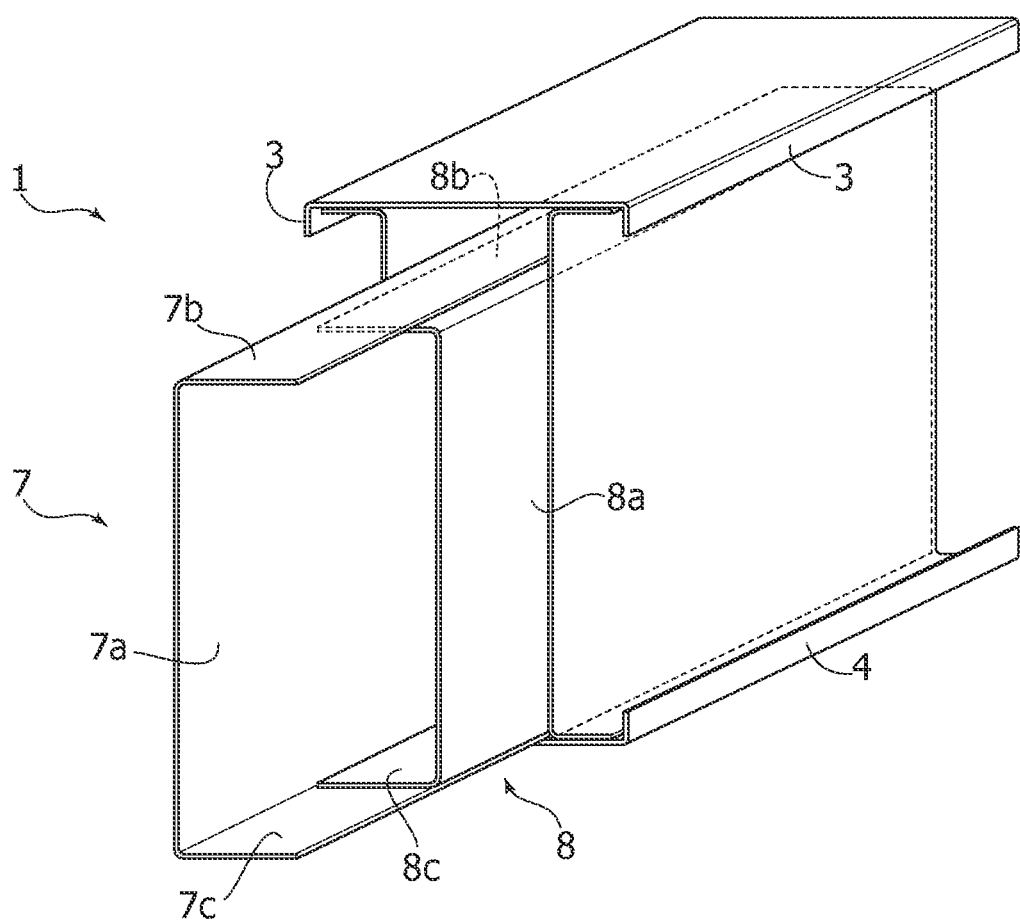

With reference to FIG. 5, the first shielding element 7 is shaped and arranged so that the fins 7b, 7c face the smaller lateral surfaces of the respective conductor bars (not represented in the figure so as to facilitate the viewing of the other elements) and the base 7a faces the larger surfaces of the group of conductor bars 5. The second shielding element 8 is arranged in a mirror-like manner with respect to the first shielding element 7, so that fin 8b is superimposed on fin 7b, fin 8c is superimposed on fin 7c and the base 8a faces the larger surfaces of the group of conductor bars 5.

The shielding structure according to the invention can be assembled quickly and efficiently by simply applying the first shielding element 7 to the group of conductor bars 5 and then applying the second shielding element 8 in a mirror-like fashion to the first, so as to obtain a double shielding wall formed by superimposing the fins 7b, 8b, and 7c, 8c of each shielding element 7, 8 along the larger lateral surfaces of the conductor bars 5. The assembly of the busbar 1 is completed by inserting the group consisting of the conductor bars 5 and the shielding elements 7, 8 in the outer casing 2.

Figure 4:
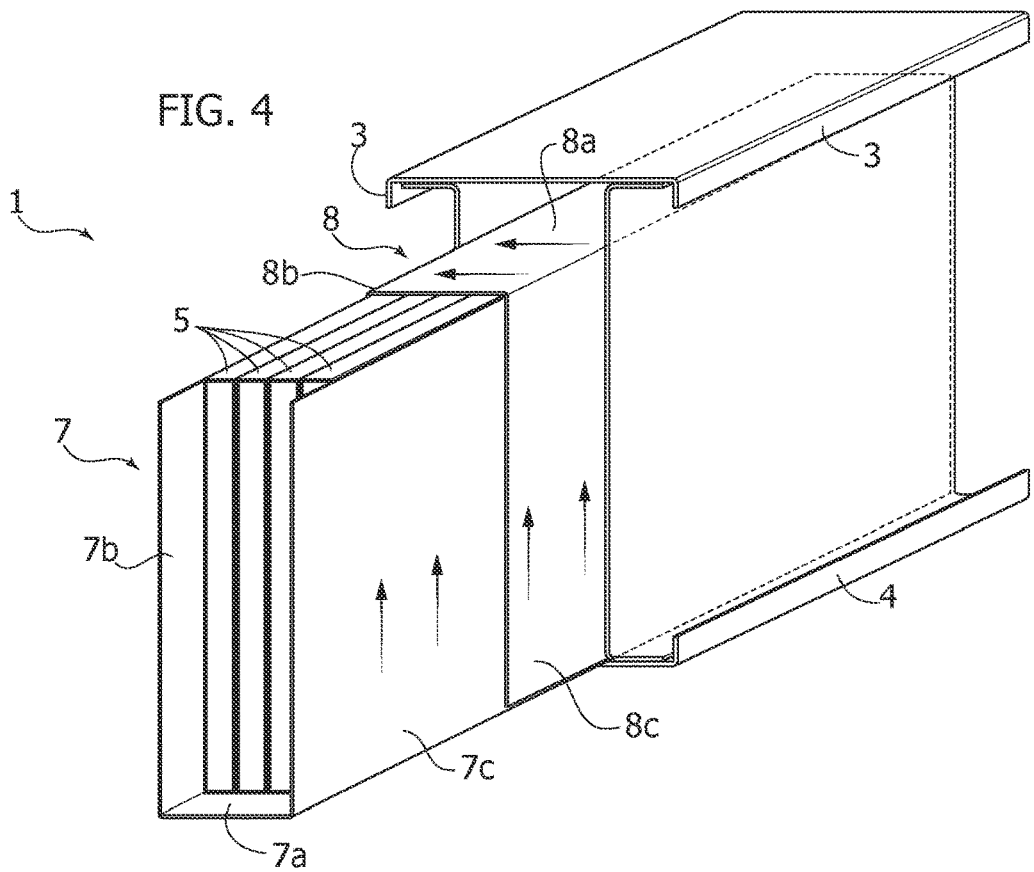

In an embodiment of the invention represented in FIG. 4, the shielding elements 7, 8 are made of anisotropic ferromagnetic material with grains oriented in the direction represented by the arrows, i.e. orthogonal to the longitudinal axis of the busbar 1. This arrangement allows to further improve the efficiency of magnetic shielding.

Obviously, the construction details and the embodiments may widely vary with respect to what has been described and illustrated, without departing from the scope of protection of the present invention as defined in the claims that follow. Thus, for example, the general conformation of the busbar 1 could be different from the one shown in the drawings, and it could have different shapes and dimensions.

The invention claimed is:

1. A busbar comprising:
   at least one rigid conductor bar,
   an outer support casing enclosing said at least one conductor bar,
   a magnetic shielding structure arranged between said at least one conductor bar and the outer support casing, said magnetic shielding structure comprising a first shielding element and a second shielding element, each of which is formed by at least one U-shaped folded strip comprising two fins and a base,
   said shielding elements consisting of a ferromagnetic material and enclosing—on opposite sides—said at least one conductor bar, with each fin of the two fins of the first shielding element which is totally superimposed on a homologous fin of the two fins of the second shielding element.

2. The busbar according to claim 1, wherein said shielding elements consist of anisotropic ferromagnetic strips.

3. The busbar according to claim 2, wherein said anisotropic ferromagnetic strips have grains oriented in a direction orthogonal to a longitudinal axis of said at least one conductor bar.

4. The busbar according to claim 1, further comprising a plurality of conductor bars with a flattened rectangular-shaped cross-section arranged parallel to each other along a longitudinal direction.

5. The busbar according to claim 4, wherein said plurality of conductor bars has a generally prismatic shape with two larger sides and two smaller sides and said bases of said shielding elements face the respective smaller sides of the plurality of conductor bars and said fins face the respective larger sides of the plurality of conductor bars.

6. The busbar according to claim 4, wherein said plurality of conductor bars has a generally prismatic shape with two larger sides and two smaller sides and said bases of said shielding elements face the respective larger sides of the plurality of conductor bars and said fins face the respective smaller sides of the plurality of conductor bars.

7. The busbar according to claim 4, wherein said conductor bars of said plurality are separated from each other by an insulating material.

8. The busbar according to claim 1, wherein said outer support casing enclosing said at least one conductor bar is provided with flanges.

9. A busbar comprising:
- at least one rigid conductor bar,
- an outer support casing enclosing said at least one conductor bar,
- a magnetic shielding structure arranged between said at least one conductor bar and the outer support casing, said magnetic shielding structure comprising a first shielding element and a second shielding element, each of which is formed by at least one U-shaped folded strip comprising two fins and a base,
- said shielding elements consisting of a ferromagnetic material and enclosing—on opposite sides—said at least one conductor bar, with each fin of the two fins of the first shielding element which is totally superimposed on a homologous fin of the two fins of the second shielding element;
- a plurality of conductor bars with a flattened rectangular-shaped cross-section arranged parallel to each other along a longitudinal direction; and
- wherein said plurality of conductor bars has a generally prismatic shape with two larger sides and two smaller sides and said bases of said shielding elements face the respective larger sides of the plurality of conductor bars and said fins face the respective smaller sides of the plurality of conductor bars.

* * * * *